united States Patent Office 3,790,512
Patented Feb. 5, 1974

3,790,512
POLYAMIDE RESIN-DYE COMPOSITIONS AND
METHODS OF MAKING THE SAME
Edgar R. Wagner, 11 E. 32nd St. 10016, and Charles
W. Gould, 65 Central Park W. 10023, both of New
York, N.Y.
No Drawing. Original application Dec. 7, 1970, Ser. No.
95,895, now Patent No. 3,743,622. Divided and this
application Mar. 13, 1973, Ser. No. 340,650
Int. Cl. A61k 7/12; C08g 51/04
U.S. Cl. 260—14
8 Claims

ABSTRACT OF THE DISCLOSURE

A resin-dye complex for topical application to human and non-human keratinous materials and synthetic fibers, said complex being made of a polyamide-polyamine compound reacted with a heat-reactive phenolic material having appreciable alcohol solubility, said resulting resin being complexed with a dye.

---

This is a division of application Ser. No. 95,895, filed Dec. 7, 1970 and now Pat. No. 3,743,622.

BACKGROUND OF THE INVENTION

Field of the invention

This invention relates to resin-dyes and, more particularly, to novel resin-dye compositions which are flexible and soluble in secondary butyl alcohol-water mixture and which are useful for application to human hair or other fibers and fabrics in the form of a colored film which has characteristics of firm adherence, resistance to abrasion and washing with soap and the like, and with methods for producing said compositions.

Description of the prior art

Earlier attempts to color hair by overcoating used suspensions of pigments in resinous vehicles, as in lacquers. When such pigment suspensions were used, the coating was so thick as to stiffen the hair and also to cement adadjoining hair together in clumps. Spirit soluble lacquers in which dyes were dissolved, when applied in film thicknesses thin enough to leave a natural drape and "hand" to the hair, never achieved depth of shade needed to give satisfactory colors, and the free dye was also often a skin irritant or poison. This type of coating also caused hair to stick together. Furthermore, commercial lacquers are made with solvents that are prohibited for use on human subjects by the U.S. Food & Drug Administration. Shampoo resistance was either low or the films too difficult to remove, and such products used for hair coloring have been withdrawn from the market because of these adverse effects.

THE INVENTION

The foregoing and other disadvantages and defects of prior art compositions are overcome by the provision of a novel resin-dye complex which comprises a polyamide-polyamine compound that is substantially balanced in its electrical character and which is reacted with a suitable heat-reactive phenolic material such as phenol or polyphenol and their homologues to form a polyamide-polyamine-polyphenol resin having appreciable alcohol solubility, the resulting resin being complexed with a suitable dye.

We make a resin-dye combination in which the dye is substantive to the resin, i.e., it is attached to the resin by molecular forces other than the ordinary valence forces such as covalence or ionic valence. These molecular forces are mostly hydrogen bonding and, to some extent, Van de Waal's forces, both electrostatic in nature, as distinct from covalence where the electrons are shared between two atoms in a molecule; or from ionic valence where one or more electrons are attached to one part of a molecule, and which thereby leaves an equal positive charge on another part, or radical, and which parts can be separated electrolytically.

Our combination of resin and dye can be varied in composition continuously, within wide limits, whereas a valence bonded combination varies only in distinct integral steps.

Our combinations fall in the general category of molecular complexes, and these are stable under ordinary conditions of temperature and solution, but are unstable at higher temperatures, but which temperatures are much below the decomposition temperatures of the usual covalent types.

We have had to develop a resin that could not only hold dye firmly, but also adhere to hair. This required the combination of molecules that contributed high bonding strength, plus others, that gave solubility in solvents that were non-toxic, and which had a fairly high degree of compatibility with water. The resulting resin-dye had to adhere so strongly to hair that it would withstand repeated shampooing, and which, when dry, would resist abrasion losses. It had to have high color intensity because the film is much thinner than the hair it coats. We find that about 20% of the weight of the resin, in metal complex dye, is advantageous to give depth of color sufficient to produce a black or deep brown. When pigments were previously used, stiffening of the hair resulted, and this was unacceptable.

Our resin, in its final form, has a backbone that is composed of a polyamide-polyamine fraction, plus phenol or polyphenol fractions, and may contain side chains of resorcinol-formaldehyde, and/or methylolacrylamide, added for increased solubility and for increased bonding strength.

Ordinarily, solubility in alcohol plus water is obtained by introducing ether groups and amine groups into the backbone of the polyamide-polyamine. However, we find that both the ether and the amine groups neutralize the bonding power of the phenolic hydroxy groups when present alone. We have found that they can be balanced against each other so as to provide solubility without interfering with the bonding strength. One way in which this is done is by proportioning the polyamines, in which the secondary or tertiary amine group remains free, so that approximately 1–1.5 amine groups are present for every ether group. (Polyglycoldiamine 190 has two ether groups, and polyethylene glycoldiamine 221 has 3.7 ether groups).

Although hydrogen bonding is possessed by every molecule in which a hydrogen atom is attached to an oxygen or nitrogen atom, the degree of bonding power varies over wide limits. When an electro-negative group such as nitro, ether, or a carbonyl group is present, hydrogen that is connected to an oxygen or nitrogen atom in an adjoining molecule will bond with it. Phenolic OH groups possess outstanding hydrogen bonding power when alone, and this power is strengthened by negative atoms, such as chlorine, in the same benzene ring, whereas it is weakened when the substituent is an electro-positive group such as primary, secondary, or tertiary amines. Nitro groups are negative, but while they increase the bonding strength of the phenolic OH group, they also bond to it and can completely neutralize its strength. This is true whether the nitro group is in another molecule in the same solvent system, or on the same benzene ring. It therefore becomes advantageous to bring into proper relationship all these factors to achieve the foregoing desired results. This is accomplished by introducing sufficient amine groups, which are electropositive, into the polyamide-polyamine chain to at least neutralize or exceed the negative groups such as ether or nitro groups.

We have further found that the long chain dibasic and amino acids used in formulating our polyamide-polyamines contribute to their solubility in secondary butyl alcohol, together with quickest solvent release on drying. We therefore use acids containing six (6) or more carbon atoms in a line.

The phenolic resin fraction is composed of commercially available short chain phenolic resins that have molecular weights under 1,000, are "heat-reactive," and are predominantly dimethylol derivatives. These resins usually carry alkyl side chains attached to the benzene ring. We find that those resins that have side chains of six (6) or more carbon atoms give best shampoo resistance, without decrease in dye bonding capacity. The reactive methylol group can combine directly with the hydrogen of an amine group—usually a terminal group—and may also be combined with the amide hydrogen of methylolacrylamide.

nI the case of methylolacrylamide, the double bond, being in a conjugate system, is reactive, and readily adds on to the amine hydrogen of a polyamide-polyamine, again usually on the terminal amine group. This gives a chain of polyamide-polyamine-polyphenol groups. In one example, we use a ratio of five (5) molecules of the polyamide-polyamine to three (3) polyphenol molecules to produce a final product having a molecular weight of around 30,000. Other suitable ratios may also be used.

This resin alone, namely, polyamide-polyamine-polyphenol, while it has many points at which hydrogen bonding can occur, may not possess bonding power sufficient to meet our requirements since some of the 1:2 metal complex dyes muzzle much of this bonding power when used in 20% concentration, calculated on the weight of the resin. We find that methylol resorcinol, or formaldehyde resorcinol, adds considerably to solubility of the final resin-dye and that 6–8 additional molecules of methylolacrylamide gives added bonding power and resulting greater shampoo and abrasion resistance of the film on the hair.

Hence, it is clear that if a resin of said composition is to serve for bonding both the dye and the hair, it must have a sufficient number of bonding groups in excess of those groups which are internally bonded as between ether and phenolic hydroxy groups, and between amine and phenolic hydroxy groups so as to bond firmly onto the hair, and that the entire composition of resin-dye have suitable or adequate solubility characteristics for satisfactory or desirable color intensity when solubilized or dispersed in a solvent system of secondary alcohol and water containing thickening and rinsing aids such as noted in our formulations described hereinafter.

This invention consists of a process for producing transparent colored coating for hair in which the dye is so firmly bound to a resin, i.e., so strongly substantive, that the dye does not migrate into the hair, in contrast to the usual method of coloring hair. The product of our process is so strongly adherent to hair that it resists both normal strength shampoos and abrasion, but is only weakly adherent to skin and can be removed from skin with soap and water. Color intensity is so high that a layer whose thickness is of the order of .0001 to .0005 inch will give deep shades—even black—on very light gray hair while leaving the hair with a natural drape and soft hand.

Substantivity, in dyestuffs, is attributed to a combination of hydrogen bonding and Van der Waal's forces, both electrostatic in nature, and is distinct from the usual ionic or covalent type of bonding. The hydrogen bond is known to be much stronger than the Van der Waal's force, but is weaker than a covalent or ionic bond. We have found that when dyes are covalently bonded to a resin, color intensity suffers, apparently because of interference with resonance. On the other hand, hydrogen bonding gives full color values. We have found that when a polyamide having strong hydrogen bonding to a dye is used, the color value obtained by such a combination is greater than when the polyamide has dye side chains affixed by covalence.

Since resins, synthetic or natural, that are composed of polar compounds—especially when they contain hydrogen that is connected to nitrogen or oxygen—all have some hydrogen bonding capability, it follows that they will also have a certain degree of dye-bonding capacity for properly chosen dyes. However, the bond to hair is also due to hydrogen bonding, and all commercial resins—polyamide, polyester, etc.—when combined with enough dye in equal film thickness to give even moderate depths of color, lose their bond to hair and are readily removed by shampooing. Furthermore, no resin dye that has been made by us from commercial polyamides or from formulations given in the literature, has been found to be able to carry enough dye to meet requirements of depth of shade, solubility, hair adhesion, drape, abrasion and shampoo resistance, removability and product stability.

We have found that in all cases where a dye is substantive to a resin, that a molecular complex is formed whose solubility is often different from either that of the dye or of the resin. We have further found that while a sulfonated dye may be substantive to the resin, and form a strong hold to it, the entire resin-dye compound is removable from hair by shampooing—the bond to hair being weaker than the solubilizing action of the sodium salt of the sulfonic acid radical, when soap is present in the shampoo.

In order to achieve improved shampoo resistance, we have, therefore, employed unsulfonated dyes—preferably the 1:2 metal complexes (1 metal atom:2 dye molecules). Our resin-dyes, in contrast to previous commercial hair dyes, particularly the permanent paraphenylene diamine types, while essentially permanent and resistant to normal concentration of commonly used shampoos, are readily removable from the surface of the hair by supplementing such conventional cationic, anionic, or non-ionic shampoos with a sufficient amount of an organic solvent such as a glycol-ether or the like. This is not possible with the commercial permanent hair dyes previously on the market which are required to, and do, penetrate the hair shaft for purposes of coloration.

What we have done, therefore, is to develop a process and formulation which, while bearing certain similarities to the prior art shown, are essentially different in the choice of components, and in the way they are combined to produce an end product which has the desired properties, and which differ fundamentally from all other combinations of resin+dye or pigment+resin, where commercially existent or indicated in any of the patents investigated. Many combinations of dye with resin that earlier patents have described, use covalent bonding of dye to resin; they differe from each other in the nature of the bond—whether it is an ester, amide, ether, or other like linkage.

Others, like Jacobson (U.S. Pat. 3,268,461, Aug. 23, 1966), grind pigments into a polyamide vehicle to make inks, in which instances wetting, adsorption, and absorption are involved.

Our films are of the order of .0001 to .0003 inch thick. This is essential because films that are as thick as, or thicker than the diameter of the hair being coated, stiffen the hair and interfere with the natural drape and feel. The requirement of minimal thickness of film rules out pigment suspensions as in paints and lacquers.

It is also well known in the art of formulating inks that acidic resins such as shellac, for example, must never be used with a basic pigment such as zinc oxide or with a basic dye, because gels result that interfere with ink flow.

Our resins, on the other hand, are so formulated that most of the previously mentioned shortcomings are avoided, and by making the dye substantive to the resin a unitary resin-dye complex is obtained in which neither dye nor resin acts independently when in solution in secondary butyl alcohol and water, and which possesses, additionally, stronger bonding power to hair than to itself, so that films on adjoining hair do not cement together. In some cases, for non-human application, any partially water-miscible alcohols might be used if they are suitable for the purpose of coloring natural or synthetic fibers such as are utilized in wigs, furs, fabrics, and the like.

For human use, drying must be by evaporation at temperatures employed in hair dryers—about 45° C. to 50° C.—to bring application time into practicable limits.

As our resin-dyes are apparently molecular complexes in which the bonding forces involved are mainly hydrogen bonding, Van der Waal's forces, or similar electrostatic forces, other than covalence or ionic valence, their composition can be varied continuously within wide limits. We have made these compounds with from less than 1% to as much as 60% of dye, calculated on the weight of the resin used. For practical purposes, less than 10% dye may have too little color intensity, while more than 30% might introduce solubility problems when secondary butyl alcohol, with or without water, is the solvent. In all concentrations, however, the resin-dye acts as a unit. No free dye exists in our combinations and, therefore, no dye can diffuse into the hair shaft.

In order to resist abrasion and normal concentrations of shampoo, this product must adhere firmly to the substrate, e.g., hair, and we accomplish this by having excess hydrogen bonding capacity beyond that needed to hold the dye, built into the resin. In addition, the film must have sufficient cohesion so that the outermost molecules of the film do not rub off.

Examples follow in which two types of resin are produced. Our polyamides are of two general types: (1) polyamide-polyamine-polyphenol in which the methylol polyphenol is directly attached to the polyamine fraction, and (2) where the methylol groups of the polyphenol fraction are first reacted with a methylol amide that contains a conjugate double bond which subsequently opens up to react with an amine group of the polyamide-polyamine fraction.

Since it has been our experience that a multiplicity of phenol groups give best bonding power for resin to dye and resin-dye to hair, we have found it necessary to design a type of resin that gives the solubility of the polyamide-polyamine resin with the bonding power of the phenol, uninterfered with by the solubilizing chemical groups such as amine which are usually present, and ether groups which may be present. This has been accomplished by making low molecular weight polyamide-polyamine compounds and causing them to react with low molecular weight phenolic resins tha have active methylol groups and/or conjugated double bonds. These short chain polyamide-polyamines are made by reacting dibasic acids— and optionally, amino acids or lactams—with aliphatic diamines and triamines.

The following are typical examples for making our low molecular weight polyamide-polyamine resins.

EXAMPLE I

| | Molecular weights |
|---|---|
| 3 molecules amino undecanoic acid | 603 |
| 1 molecule polyglycoldiamine 221 (Union Carbide) | 221 |
| 4 molecules methylimino bispropylamine (Jefferson Chemical Co.) | 580 |
| 2 molecules dodecanedioic acid | 460 |
| 2 molecules dimer acid | 1200 |

These ingredients were mixed in m/10 quantities, and by application of heat are melted together in an atmosphere of nitrogen for at least four hours. Reaction commenced at approximately 145° C., and water evalution was at its peak at about 155° C.–160° C. No significant $H_2O$ evolution was observed about 175° C. Final temperatures were from about 210° C. to 230° C. The theoretical molecular weight is 2920 and titration shows 6 amine groups—two primary, and four tertiary—calculated for the theoretical molecular weight.

EXAMPLE II

| | Molecular weights |
|---|---|
| 1 molecule aminoundecanoic acid | 201 |
| 4 molecules xylylenediamine | 544 |
| 3 molecules diethylene triamine | 309 |
| 4 molecules polypropyleneglycoldiamine 190 (Jefferson Chemical Co.) | 760 |
| 7 molecules dodecanedioic acid | 1610 |
| 3 molecules dimer acid | 1800 |

The mixture was heated at 145° C.–220° C. for five hours. Reaction began at 145° C.–147° C. $H_2O$ evolution was at peak at 165° C. No further $H_2O$ evolution was observed above 205° C. Final temperatures were from about 210° C. to 230° C. Titration showed five amine groups— two terminal primary amine groups and three secondary amine groups—for the theoretical weight of 4990.

EXAMPLE III

| | Molecular weights |
|---|---|
| 3 molecules diethylene triamine | 309 |
| 2 molecules polypropyleneglycoldiamine 230 (Jefferson Chemical) | 460 |
| 3 molecules Laromin C (cycloalkane diamine) (B.A.S.F.) | 720 |
| 2 molecules dimer acid | 1200 |
| 5 molecules dodecanedioic acid | 1150 |
| 2 molecules caprolactam | 226 |

Laromin C is a mixture of cycloalkane diamines of the type di-(methylcyclohexyl) diamine.

The above mixture was heated for five and one-half hours, from 140° C. to 215° C. Reaction commenced at 140° C.–142° C., and visible evolution of vapors ceased at about 200° C. Titration indicated 5.1 amine groups when calculated for the theoretical molecular weight of 3813.

Approximately 5% by weight excess of triamine in the foregoing Examples I, II and III, is used to compensate for losses occurring through volatilization with the steam generated by the reactions.

These short chain polyamides-polyamines are combined directly or indirectly with low molecular weight phenolic resins that have several unreacted methylol groups. They are commercially available as CKM–1734 and CRM–0803 from Union Carbide Corporation; Durite SK 798–74 of Borden Company, and Amberol ST–137 of Rohm & Haas. The CKM–1734 and CRM–0803 have approximate molecular weights of 700, while Durite SD 798–74 has an approximate molecular weight of 400. All are heat reactive and contain 3 to 4 phenol radicals and all, except the Durite, are made from alkyl phenols. We have found that those made with the longer alkyl groups, having at least four carbon atoms, as in CRM–0803, give better detergent resistance than do those with shorter chain alkyl radicals.

The phenolic resin may be combined with the polyamide-polyamine either directly, by reaction of its methylol groups with the amine groups of the polyamide as shown in the following Method I, and which produces a product that is soluble in secondary butyl alcohol plus water, or indirectly by first reacting the methylol groups of the polyphenol with N-methylolacrylamide, as in Method II.

The latter reaction is conducted under mildly acidic conditions—approximately pH 3 to pH 5—in order to catalyze the reaction of the methylol-amide condensation and to prevent the opening of the double bond.

METHOD I

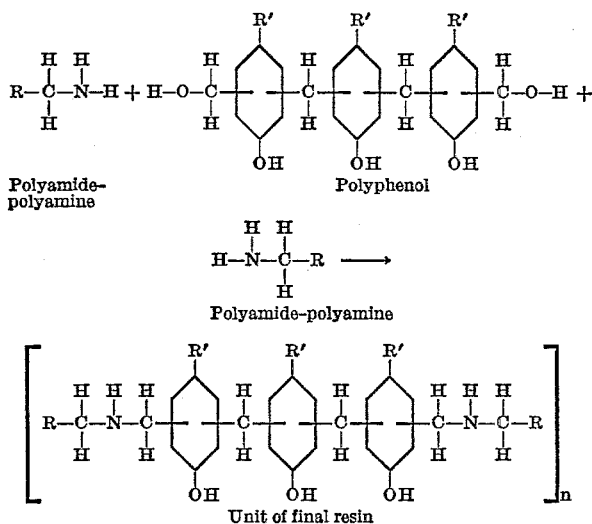

R is balance of polyamide-polyamine.
R' is H or any hydrocarbon radical.

In the following Method II, the process comprises a first step of combining a heat-reactive polyphenol with a methylol amide having conjugated double bonds such as N-methylol acrylamide, N-methylol crotonamide, or N-methylol methacrylamide. In the second step, the product of the first step is reacted with a polyamide-polyamine to form a resin which can be used directly, or further modified to produce the resin-dye complexes herein.

METHOD II

STEP I

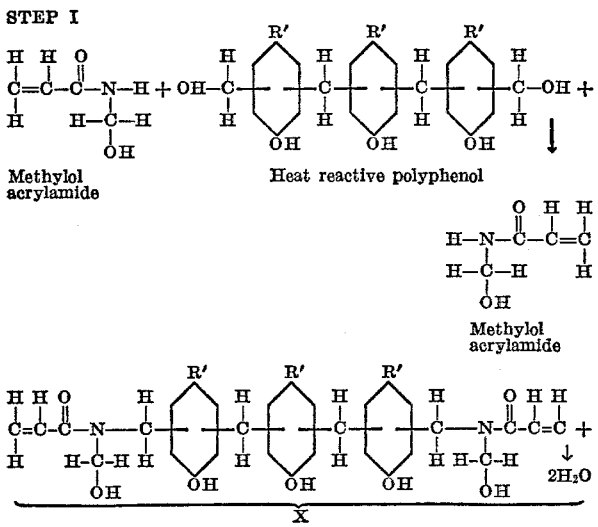

R' is H or any hydrocarbon radical.
X is polyphenol methylol acrylamide.

STEP II

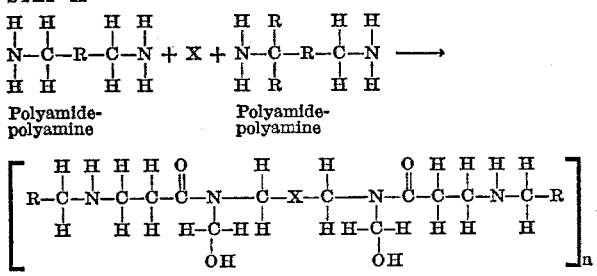

Polyamide-polyamine-polyphenol resin where R is the balance of the polyamide-polyamine molecule.

We now have a series of polyphenol radicals connected at each end with a polyamide-polyamine. We have found a satisfactory combination for solubility and for bonding power to dye, and to hair, to be the reaction product of 7 to 10 molecules of polyamide-polyamine with 5–9 molecules of the polyphenol as in Method I. In Method II, the polyphenol is replaced by 5 to 9 molecules of the reaction product of polyphenol and methylolacrylamide, assuming the reaction product to have a molecular weight of 900. By the introduction of phenolic groups into the polyamide-polyamine chain, resulting in a polyamide-polyamine-polyphenol there is achieved a considerable degree of bonding power. Optionally, in order further to enhance both the solubility and the bonding power of the polyamide-polyamine-polyphenol, step (a) and (b) may be followed:

(a) Adding 2–8 molecules of the formaldehyde adduct of a dihydroxybenzene such as catechol, resorcinol, hydroquinone or their homologues, which is made in approximately 1:1 molecular ratio of resorcinol to formaldehyde, for example. This is made from 1 molecule of resorcinol plus 1 of formaldehyde, in secondary butyl alcohol and at approximately 10% concentration, using 1% acetic acid as catalyst and allowing the solution to stand at room temperature for approximately 48 hours. The mixture of resorcinol-formaldehyde with the polyamide-polyamine-polyphenol methylolacrylamide is then refluxed for from 2–3 hours at a pH of 8–10. (b) 1–10 molecules of methylolacrylamide may then be added to the above described solution and again refluxed for 2–3 hours.

The resorcinol-formaldehyde has been found to increase solubility of the resin-dye and stability of the solutions in secondary butyl alcohol. The methylol acrylamide adds to the bonding power of the resin-dye and gives it greater shampoo resistance. It is not known just how the resorcinol-formaldehyde attaches to the resin, since it may react with the hydrogen of an amine or amide group, or with a phenol, all of which are present. The methylolacrylamide most probably reacts with primary or secondary amines by opening of the double bond to form secondary or tertiary amines at the backbone. This resin solution, which has had a pH of 8–10 up to this point, is now made acid to pH 3.5–5.0 with acetic acid, and then the dye, in an amount equal to 12%–30% of the weight of the resin, is added.

We have found it most convenient to make a 5% solution of the dye in the monomethyl ether of propylene glycol, although any other good slvent that is also water soluble may be used. This resin-dye solution is allowed to stand from 5 to 10 minutes at 75°–90° C., to reach equilibrium, following which it is cooled to 40° C. or lower, and then poured into sufficient cold water+$NH_4OH$ or other mild alkali to precipitate it at a final pH of about 6.5 to 8. A coagulant, usually ammonium thiocyanate, may be added. A soluble thiosulfate, or sodium chloride, also may be used but require higher concentrations to be equally effective. The precipitated product is washed free of salt and de-watered. It is then dissolved in secondary butyl alcohol with about 10%–30% water, to a concentration of approximately 5%–6%. This solution is now the basis for the final product, which is varied in composition to meet various requirements such as solubility of resin-dye made from different dyes and different drying times.

The manner of making the final resin-dye products is described in the following examples.

EXAMPLE IV

Part (A): Grams

| | |
|---|---|
| 5% resin-dye solution in secondary butyl alcohol and 10%–30% water, containing 15%–20% Irgacet Black RL (of wt. of resin) | 100 |
| Cyclohexanone | 0.5 |
| Glacial acetic acid | 0.5 |
| Propylene glycol monomethylether | 1.5 |
| Secondary butyl alcohol | 5.0 |
| Acetone | 7.0 |
| Water | 5.0 |

Part (B):

| | |
|---|---|
| Water saturated with secondary butyl alcohol | 75 |
| Cyclohexanone | 0.5 |
| Glacial acetic acid | 0.5 |
| Propylene glycol monomethylether | 1.5 |
| Acetone | 7.0 |
| Propylene glycol | 0.5 |

Parts (A) and (B) are mixed together with thorough agitation and allowed to stand at room temperature for at least 24 hours, since an initial metastable equilibrium slowly converts to the final form in that time. A clear dispersion-solution results which, on evaporating on hair, leaves a continuous, strongly adherent and glossy film of high color intensity that can be rinsed with cold water immediately after applying and, if desired, can be shampooed without loss of color when dry. The high boiling solvents as in Example IV and in the following Example V, are added in small quantity and have been found desirable in many cases for producing a smooth film.

EXAMPLE V

Part (A): Grams

| | |
|---|---|
| 5% resin-dye solution in secondary butyl alcohol and 10% to 25% water, containing Spirit Soluble Brown BE (B.A.S.F. Co.) (20% wt. of resin) | 100 |
| Cyclohexanone | 0.5 |
| Glacial acetic acid | 0.5 |
| Propylene glycol monomethyl ether | 1.5 |
| Secondary butyl alcohol | 1.0 |
| Acetone | 7.0 |

Part (B):

| | |
|---|---|
| Water saturated with secondary butyl alcohol | 75 |
| Propylene glycol | 0.5 |
| Cyclohexanone | 0.5 |
| Glacial acetic acid | 0.5 |
| Propylene glycol monomethyl ether | 1.5 |
| Acetone | 7.0 |

Mix as directed in Example IV. These preparations of Examples IV and V exhibit comparatively low viscosity characteristics and must be used with a suitable applicator.

Although several types of dyes may be used, we have chosen the 1:2 metal complex dyes, preferably the azo types, because they have been shown to form the most suitable resin-dyes for our purposes from the standpoint of firmness of combination with the resins, high color intensity, good stability of the solution-emulsions, and very low fat solubility and toxicity. These molecules are also much larger than those of the non-metalized dyes and this, together with their negligible fat solubility, renders them practically incapable of penetrating into the pores and of being absorbed in the blood stream.

While many of the 1:2 metal complex dyes may be added directly to the resin solution, we find that some, especially the blacks and to a lesser extent the browns, tend to cross-link with the resin if the latter has free primary or secondary amine groups, and this is most pronounced when there are no phenolic groups in the backbone. These cross-linked products vary widely in solubility in secondary butyl-alcohol plus water, but the blacks, especially, form products that are only sparingly soluble in the secondary butyl alcohol plus water, and leave the supernatant liquid with only low color intensity.

We have found that this cross-linking can be kept within acceptable limits if the dye is first mixed, in solution, with approximately one molecule of methyl ethyl ketone, acetyl acetone or an alkyl acetoacetate, a dialkyl itaconate, or an alkyl or hydroxyalkyl methacrylate, for each molecule of dye.

The following are typical examples of 1:2 metal dyes listed in the Colour Index (C.I.):

| Color: | Listed as |
|---|---|
| Zapon Black BE (BASF) | C.I. #12195. |
| Zapon Fast Brown BE (BASF) | Solvent Brown 37. |
| Zapon Fast Yellow 3RE (BASF) | Solvent Orange 45 and C.I. #11700. |
| Zapon Fast Red GE (BASF) | Solvent Red and C.I. #12716. |
| Orasol Brown 5R (Ciba) | Solvent Brown #35. |
| Orasol Black BV (Ciba) | Solvent Black #6. |
| Irgacet Black RL (Geigy) | Solvent Black #29. |
| Irgacet Brown 2RL (Geigy) | Solvent Brown #42. |

We find that basic dyes such as Bismark Brown, for example, form weaker combinations with our polyamide-polyamine-polyphenolic resins but give good color coating on hair. However, this type of resin-dye has relatively poor shampoo resistance and when stripped from the hair, leaves some free dye to enter the hair and to stain the skin.

Phenolic dyes, such as alizarin, form firm combinations with basic resins. Thus, if a 5% solution of alizarin is mixed with an alcohol solution of the resin, in the proportion of 15–20 parts dye to 100 parts of resin, and then precipitated in water, and redissolving the precipitated products in 66/33 secondary butyl alcohol-water, a stable solution results whose emulsions give hair coatings with fair soap resistance.

Our resins, as now formulated, have a relatively high water tolerance in secondary butyl alcohol solution and are to a very large degree self-emulsifying, thereby giving greater stability to the product and to the film during the drying process with its rapid changes of composition of solvent phase. Similarly, our resin-dyes as now formulated, preferably with 1:2 metal dyes, have a relatively high water tolerance in secondary butyl alcohol solution, contributing also to greater stability to the product during the film-forming stage, in which the bond to the hair is established.

Earlier work had shown that emulsions made with most emulsifying agents or protective colloids had poor bonding to hair because the emulsifier formed a barrier between hair and resin-dye.

Many of the usual thickening agents—starches, gums, etc.—do not tolerate alcohol and some, such as ethyl cellulose, polyvinyl-alcohol, polyvinyl pyrrolidone, interfere with the bond between resin-dye and hair.

We have discovered that ethoxylated and propoxylated polyols, when combined either with mixed ethoxylated cellulose or with hydroxypropyl cellulose, and which have both water and butyl-water solubility, serve successfully as colloid dispersing, thickening and protective agents when used in limited quantity, such as approximately 10% to 40% by weight, in the secondary butyl-water systems containing our resin-dyes, without incurring the aforementioned interferences. The viscosity effect may be enhanced by the use of a diketone such as acetyl acetone added to the foregoing mixture in a quantity equal to between 5% to 15% of the weight of the cellulose derivative used. In order to obtain maximum viscosities from these materials in a secondary butyl alcohol:$H_2O$ system, we have used polyhydroxy phenols and esters of polyhydroxy phenolic acids, as later shown, which serve to increase the viscosity thereof markedly. It is noteworthy that these polymers should be maintained in suitable balance of secondary butyl:H₂O compositions to that employed for resin-dye solution, so as to make for a homogenous solution-dispersion.

The viscosity of our resin-dye preparation may be varied within wide limits to suit various methods of application. If the method of application requires deposition of the fluid on the hair and then spreading it with comb or fingers, a higher viscosity is needed to prevent dripping and a suitable thickener is incorporated for that purpose.

The thickening effect may be varied by changing the concentration of the individual ingredients, and it may be considerably increased by the addition of those agents that have strong hydrogen bonding properties on two or more groups in a molecule, to effect a crosslinkage. We have found phloroglucinol and pyrogallol, as well as the esters of polyhydroxy phenolic acids, such as those of gallic acid, to be very effective. We also find this effect to be produced by diketones such as acetylacetone, and by esters of keto acids such as ethylacetoacetate. We have discovered that the ethoxylated-propoxylated polyols greatly decrease the adhesion of the resin-dye to the skin, thereby making its removal from the skin easier.

THICKENER EXAMPLE I

To 95 grams cold water, in a blender or high speed mixer, add 0.5 gram phloroglucinol (or resorcinol, catechol, etc.). When dissolved, add slowly 5.0 grams Klucel H (Hercules, Inc.). Mix thoroughly. Add 250 grams secondary butyl alcohol containing 20 grams Pluronic P–104 (Wyandotte Chemical Co.). Stir at high speed until there are no lumps of gel.

THICKENER EXAMPLE II

To 95 grams water in a blender, add 250 grams secondary butylalcohol
50 grams P–104 (an ethoxy-propoxypolyol)
5 grams acetoylacetone.

Mix thoroughly, and when uniform, add 5 grams Klucel H slowly (hydroxypropyl cellulose). Stir until no lumps remain.

THICKENER EXAMPLE III 95 grams water
250 grams secondary butyl alcohol
20 grams Pluronic P–104 (an ethoxy propoxypolyol)
20 grams Pluronic L–101 (an ethoxy propoxypolyol)
5 grams acetylacetone.

Mix thoroughly and add slowly 5 grams Klucel H. Stir until uniform.

While the foregoing procedures give good depth of color, film continuity, drape, abrasion and shampoo resistance, they leave the hair with somewhat drier "feel" than it possessed originally. This dryness may be counteracted in two ways: (1) by subsequent application of a shampoo containing emulsified wax or fatty substances, or (2) by incorporation into the mixture of a dispersible additive that leaves a slipvery deposit upon the surface of the resin-dye film. We have called these additives "silkifiers." In the latter instance, these compounds must be dispersed within the thickener mixture, which acts as protective colloid, in order to minimize interference with bonding of resin-dye to hair. Good results have been obtained by using amides of saturated fatty acids that contain 18 or more carbon atoms, together with highly propoxylated polyols, such as Pluronic L101 as part of the thickener. Ceresin, carnauba, zinc stearate and petrolatum may also be used.

The foregoing indicates the desirability of compounds that contain strongly polar groups that can be bonded by hydrogen bonds or Van der Waal's forces sufficiently stronger to become an integral part of the thickener.

An example of the finished product is as follows: To 25 grams of thickener No. III, add 5–15 grams of 2% fatty acid amide such as arachidyl-behenyl amide, which acts as a silkifier, in hot secondary butyl alcohol. Mix thoroughly, and when cold, add, premixed, 100 grams 5%–6% resin-dye complex in 88%–12% secondary butyl alcohol plus water plus 0.3 gram glaciala cetic acid, plus 0.6 gram monomethylether of propylene glycol, plus 5.0 grams acetone. Mix thoroughly until a uniform and stable system results. This is now ready to apply to hair.

We have now achievel a homogenous solution-dispersion system suitable for application to hair in a manner so as to provide a continuous color film thereon and having sufficient density of color through an integration of properties. The design of the resin and process for producing it must provide the necessary solubility together with the required hydrogen bonding properties in order that when the dye has been added, the resulting resin-dye complex is compatible with the butyl-alcohol water solution of the polymers used for both thickening and emulsification and that the resin-dye plus thickener does not interfere with the bond, to hair, nor with the continuity of the resin-dye film.

Although the present invention has been described with reference to particular methods and examples, it will be apparent to those skilled in the art that variations and modifications can be substituted therefor without departing from the principles and true spirit of the invention. The "abstract" given above is for the convenience of technical searchers and is not to be used for interpreting the scope of the invention and claims.

What is claimed is:

1. A resin-dye complex comprising the reaction product of a polyamide-polyamine compound having a quantity of groups that are of electropositive character in an amount of at least electrically equal to or greater than the groups therein that are of electronegative character, and of a heat-reactive phenolic material to form a polyamide-polyamine-polyphenol resin having substantial solubility in secondary butyl alcohol plus water, the latter resin then being complexed with an unsulfonated dye to form a product having adequate solubility in secondary butyl alcohol plus water and having strong external bonding power, said polyamide-polyamine compound being the reaction product of lactams or amino acids or dibasic acids or mixtures thereof having six or more carbon atoms in a line, with diamines or triamines or mixtures thereof, said heat-reactive phenolic material having alkyl side chains, said resin dye complex being dissolved and dispersed in a partially water soluble alcohol plus water, said solution and dispersion containing thickening materials comprising polymers having ethylene and propylene oxide components together with cellulose derivatives containing either hydroxypropyl and/or hydroxyethyl components, plus a complexing agent taken from the group consisting of phloroglucinol, pyrogallol, propyl gallate, resorcinol, acetyl acetone and ethyl acetoacetate, said thickening materials being soluble in secondary butyl alcohol plus water.

2. A resin-dye complex according to claim 1 in which the thickening agent further includes one or more silkifying agents selected from the group consisting of amides of aliphatic acids containing at least sixteen carbon atoms, zinc stearate, carnauba wax, ceresin, and petrolatum.

3. A resin-dye complex comprising the reaction product of a polyamide-polyamine compound in which the electropositive groups are at least electrically equal to or greater than the electronegative groups therein, and of a heat-reactive polyphenol material, said reaction product then being further reacted with, first, a formaldehyde-dihydroxybenzene adduct, then with an N-methylol amide having conjugated double bonds, and finally complexing the resulting compound with an unsulfonated dye to form a product having substantial solubility in secondary butyl alcohol plus water and having strong external hydrogen bonding power, said polyamide-polyamine compound being the reaction product of lactams or amino acids or dibasic acids or mixtures thereof having six or more carbon atoms in a line, with diamines or triamines or mixtures thereof, said heat-reactive phenolic material having alkyl side chains, said resin dye complex being dissolved and dispersed in a partially water soluble alcohol plus water, said solution and dispersion containing thickening materials comprising polymers having ethylene and propylene oxide components together with cellulose derivatives containing either hydroxypropyl and/or hydroxyethyl components, plus a complexing agent taken from the group consisting of phloroglucinol, pyrogallol, propyl gallate, resorcinol, acetyl acetone and ethyl acetoacetate, said thickening materials being soluble in secondary butyl alcohol plus water.

4. A resin-dye complex according to claim 3 in which the thickening agent further includes one or more silkifying agents selected from the group consisting of amides of aliphatic acids containing at least sixteen carbon atoms, zinc stearate, carnauba wax, ceresin and petrolatum.

5. A resin-dye complex comprising the reaction product of a polyamide-polyamine compound in which the electropositive groups are at least electrically equal to or greater than the electronegative groups therein, and of a heat-reactive phenolic material that has been preliminarily combined with a methylol amide having conjugated double bonds, and finally complexing the resulting compound with an unsulfonated dye to form a product having adequate solubility in secondary butyl alcohol plus water, and having strong external hydrogen bonding power, said polyamide-polyamine compound being the reaction product of lactams or amino acids or dibasic acids or mixtures thereof having six or more carbon atoms in a line, with diamines or triamines or mixtures thereof, said heat-reactive phenolic material having alkyl side chains, said resin-dye complex being dissolved and dispersed in a partially water-soluble alcohol plus water, said solution and dispersion containing thickening materials comprising polymers having ethylene and propylene oxide components together with cellulose derivatives containing either hydroxypropyl and/or hydroxyethyl components, plus a complexing agent taken from the group consisting of phloroglucinol, pyrogallol, propyl gallate, resorcinol, acetyl acetone and ethyl acetoacetate, said thickening materials being soluble in secondary butyl alcohol plus water.

6. A resin-dye complex according to claim 5 in which the thickening agent further includes one or more silkifying agents selected from the group consisting of amides of aliphatic acids containing at least sixteen carbon atoms, zinc stearate, carnauba wax, ceresin, and petrolatum.

7. A resin-dye complex comprising the reaction product of a polyamide-polyamine compound in which the electropositive groups are at least electrically equal to or greater than the electronegative groups therein, and of a heat-reactive phenolic material that has been preliminarily combined with an N-methylol amide having conjugated double bonds, said reaction product being further reacted with, first, a formaldehyde-dihydroxybenzene adduct, then with an N-methylol amide having conjugated double bonds, and finally complexing the resulting compound with an unsulfonated dye to form a product having adequate solubility in secondary butyl alcohol plus water, and having strong external hydrogen bonding power, said polyamide-polyamine compound being the reaction product of lactams or amino acids or dibasic acids or mixtures thereof having six or more carbon atoms in a line, with diamines or triamines or mixtures thereof, said heat-reactive phenolic material having alkyl side chains, said resin-dye complex being dissolved and dispersed in a partially water soluble alcohol plus water, said solution and dispersion containing thickening materials comprising polymers having ethylene and propylene oxide components together with cellulose derivatives containing either hydroxypropyl and/or hydroxyethyl components, plus a complexing agent taken from the group consisting of phloroglucinol, pyrogallol, propyl gallate, resorcinol, acetyl acetone and ethyl acetoacetate, said thickening materials being soluble in secondary butyl alcohol plus water.

8. A resin-dye complex according to claim 7 in which the thickening agent further includes one or more silkifying agents selected from the group consisting of amides of aliphatic acids containing at least sixteen carbon atoms, zinc stearate, carnauba wax, ceresin, and petrolatum.

References Cited
UNITED STATES PATENTS

| | | | |
|---|---|---|---|
| 3,586,475 | 6/1971 | Hewitt | 8—10.1 |
| 3,597,468 | 8/1971 | Kalopissis | 8—10.1 |

WILLIAM H. SHORT, Primary Examiner

E. WOODBERRY, Assistant Examiner

8—10.1; 424—70, 71

U.S. Cl. X.R.